US012754624B2

(12) United States Patent
Eguchi

(10) Patent No.: US 12,754,624 B2
(45) Date of Patent: Oct. 6, 2026

(54) CALIBRATION OF TOUCH OPERATION FOR CONTROLLING A HEAD-MOUNTED DISPLAY APPARATUS

(71) Applicant: CANON KABUSHIKI KAISHA, Tokyo (JP)

(72) Inventor: Kouhei Eguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/928,522

(22) Filed: Oct. 28, 2024

(65) Prior Publication Data

US 2025/0165085 A1 May 22, 2025

(30) Foreign Application Priority Data

Nov. 20, 2023 (JP) ................................ 2023-196447

(51) Int. Cl.
*G06F 3/038* (2013.01)
*G06F 3/01* (2006.01)
*G06F 3/0346* (2013.01)
*G06F 3/0354* (2013.01)

(52) U.S. Cl.
CPC .............. *G06F 3/038* (2013.01); *G06F 3/013* (2013.01); *G06F 3/0346* (2013.01); *G06F 3/03547* (2013.01)

(58) Field of Classification Search
CPC ........ G06F 3/038; G06F 3/013; G06F 3/0346; G06F 3/03547; G06F 3/011
See application file for complete search history.

(56) References Cited

U.S. PATENT DOCUMENTS 11,269,406 B1 * 3/2022 Sztuk ................. G02B 27/0093
2008/0109763 A1 * 5/2008 Lee ....................... G06F 3/0488 715/856
2012/0135803 A1 5/2012 Nonaka
2013/0285884 A1 * 10/2013 Yamamoto ............. G06F 1/163 345/8
2014/0320383 A1 * 10/2014 Goto ....................... G06F 3/041 345/8
2015/0123997 A1 * 5/2015 Hayasaka .......... G02B 27/0101 345/633

(Continued)

FOREIGN PATENT DOCUMENTS

JP 2012-115414 A 6/2012
JP 2012-234476 A 11/2012

*Primary Examiner* — Rodney Amadiz
(74) *Attorney, Agent, or Firm* — Venable LLP

(57) ABSTRACT

An information processing apparatus controls an HMD in accordance with touch operation on a touch operation surface. In calibration of the touch operation, the information processing apparatus controls the HMD such that a first display position, which is a position in an image displayed by the HMD, is identifiable, causes a user to perform touch on the touch operation surface while being conscious of the first display position, acquires information on a first touch position that is a position at which the touch is performed, controls the HMD such that a second display position that has a predetermined positional relation with the first display position is identifiable, causes the user to perform touch on the touch operation surface while being conscious of the second display position, and acquires information on a second touch position that is a position at which the touch is performed.

16 Claims, 7 Drawing Sheets

(56) References Cited

U.S. PATENT DOCUMENTS

| | | | | |
|---|---|---|---|---|
| 2017/0090744 | A1* | 3/2017 | Kim | G06F 1/163 |
| 2017/0212669 | A1* | 7/2017 | Kim | G06F 3/04883 |
| 2018/0004297 | A1* | 1/2018 | Xu | G06T 19/006 |
| 2019/0065026 | A1* | 2/2019 | Kiemele | A63F 13/92 |

* cited by examiner

CALIBRATION OF TOUCH OPERATION FOR CONTROLLING A HEAD-MOUNTED DISPLAY APPARATUS

BACKGROUND OF THE INVENTION

Field of the Invention

The present invention relates to an information processing apparatus, and more particularly, to a method for operating a head mounted display apparatus.

Description of the Related Art

There are various display apparatus for displaying virtual spaces, such as a head mounted display (HMD) and a game machine. A user can operate objects in a virtual space displayed on the display apparatus by using an operation member in the real world. To improve reality, it is required that the user can operate objects with the same feeling as in life in the real world.

Japanese Patent Application Publication No. 2012-115414 discloses a technology that enables a user to operate an object displayed in 3D without feeling discomfort. In the technology disclosed in Japanese Patent Application Publication No. 2012-115414, an operation member is imaged by a camera, a relative position of the operation member with respect to the camera is calculated on the basis of the taken image of the operation member, and processing is performed on the basis of a display position of an object and the relative position of the operation member.

However, the technology disclosed in Japanese Patent Application Publication No. 2012-115414 needs to use a camera, and hence the apparatus (system) may be complicated and cost thereof may increase. Furthermore, the operation member needs to be included in the field of view of the camera, and hence the motion of the user is limited.

Furthermore, in the case where a user is wearing a head mounted display apparatus such as an HMD, the user cannot check the background of the external world (real space), which may significantly decrease the operability of user operation using an operation member. For example, when a user is experiencing a virtual space unrelated to the real space while wearing an HMD, the user cannot easily touch a desired location because the user cannot perform touch while looking at an operation member (for example, touchpad) capable of receiving touch operation.

SUMMARY OF THE INVENTION

The present invention provides a technology that enables user operation with high operability (user operation which has no limitation of motion of user and which facilitates desired instructions) with a simple configuration.

The present invention in its first aspect provides an information processing apparatus including one or more processors and/or circuitry configured to control a head mounted display apparatus in accordance with touch operation on a touch operation surface, wherein, in calibration of the touch operation, the one or more processors and/or circuitry: controls the head mounted display apparatus such that a first display position, which is a position in an image displayed by the head mounted display apparatus, is identifiable; causes a user to perform touch on the touch operation surface while being conscious of the first display position, and acquires information on a first touch position that is a position at which the touch is performed; controls the head mounted display apparatus such that a second display position that has a predetermined positional relation with the first display position is identifiable; and causes the user to perform touch on the touch operation surface while being conscious of the second display position, and acquire information on a second touch position that is a position at which the touch is performed.

The present invention in its second aspect provides a control method of an information processing apparatus configured to control a head mounted display apparatus in accordance with touch operation on a touch operation surface, the control method including a step of executing calibration of the touch operation, wherein the step of executing the calibration includes: a step of controlling the head mounted display apparatus such that a first display position, which is a position in an image displayed by the head mounted display apparatus, is identifiable; a step of causing a user to perform touch on the touch operation surface while being conscious of the first display position, and acquires information on a first touch position that is a position at which the touch is performed; a step of controlling the head mounted display apparatus such that a second display position that has a predetermined positional relation with the first display position is identifiable; and a step of causing the user to perform touch on the touch operation surface while being conscious of the second display position, and acquire information on a second touch position that is a position at which the touch is performed.

The present invention in its third aspect provides a non-transitory computer readable medium that stores a program, wherein the program causes a computer to execute a control method of an information processing apparatus configured to control a head mounted display apparatus in accordance with touch operation on a touch operation surface, the control method including a step of executing calibration of the touch operation, wherein the step of executing the calibration includes: a step of controlling the head mounted display apparatus such that a first display position, which is a position in an image displayed by the head mounted display apparatus, is identifiable; a step of causing a user to perform touch on the touch operation surface while being conscious of the first display position, and acquires information on a first touch position that is a position at which the touch is performed; a step of controlling the head mounted display apparatus such that a second display position that has a predetermined positional relation with the first display position is identifiable; and a step of causing the user to perform touch on the touch operation surface while being conscious of the second display position, and acquire information on a second touch position that is a position at which the touch is performed.

Further features of the present invention will become apparent from the following description of exemplary embodiments with reference to the attached drawings.

DESCRIPTION OF THE EMBODIMENTS

Now, embodiments of the present invention are described with reference to the accompanying drawings.

Description of Configurations

Figure 1A:
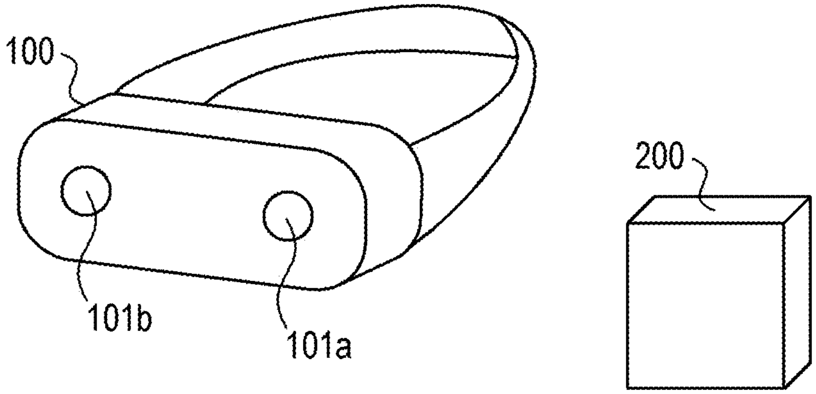
FIGS. 1A and 1B are external views of a display system.
Figure 1B:
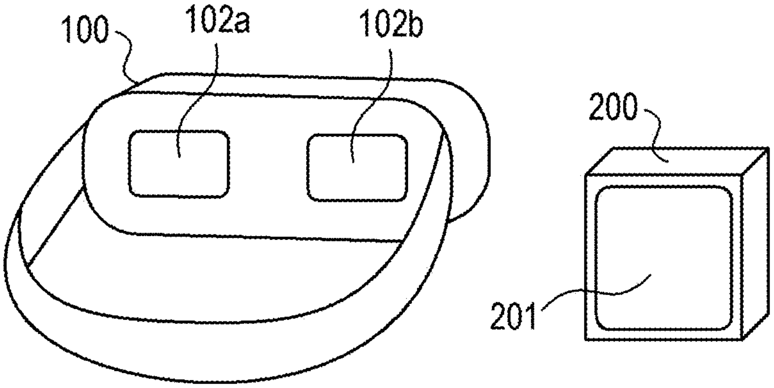

FIGS. 1A and 1B are external views illustrating a configuration of a display system according to the present embodiment. The display system according to the present embodiment includes a head mounted display (HMD) 100 as a head mounted display apparatus and a controller 200 as an operation apparatus independent from the HMD 100. FIG. 1A is a front perspective view of the display system (HMD 100 and controller 200), and FIG. 1B is a rear perspective view of the display system.

The HMD 100 has photography lenses 101*a* and 101*b* on the front side, and can take images of the external world (real space, front side of HMD 100) through the photography lenses 101*a* and 101*b*. Furthermore, the HMD 100 has display units 102*a* and 102*b* on the rear side, and can display various kinds of images on the display units 102*a* and 102*b*. The display units 102*a* and 102*b* may have a display panel such as a liquid crystal panel or an organic EL panel. The display units 102*a* and 102*b* may have a laser light source for directly projecting an image to the retina of a user.

For example, the arrangement of the display units 102*a* and 102*b* is determined such that when the HMD 100 is mounted to the head of a user, the display unit 102*a* is opposed to the left eye of the user and the display unit 102*b* is opposed to the right eye of the user. Then, the arrangement of the photography lens 101*a* is determined such that a field of view of the left eye of the user wearing the HMD 100 (a field of view on the assumption that the user is not wearing the HMD 100) is imaged through the photography lens 101*a*. Similarly, the arrangement of the photography lens 101*b* is determined such that a field of view of the right eye of the user wearing the HMD 100 (a field of view on the assumption that the user is not wearing the HMD 100) is imaged through the photography lens 101*b*.

Note that the display units 102*a* and 102*b* may display images in real space taken through the photography lenses 101*a* and 101*b* in real time. In other words, the HMD 100 may operate as a video see-through HMD. The display units 102*a* and 102*b* may display images in virtual space (for example, images in virtual space unrelated to real space). The present invention is applicable to VR (virtual reality), AR (augmented reality), and MR (mixed reality).

The controller 200 has a touch operation member 201 (for example, touchpad). The touch operation member 201 has a touch operation surface, and can receive a touch operation on the touch operation surface. In the present embodiment, information on an operation on the controller 200 (for example, a touch operation on touch operation member 201 (touch operation surface)) is transmitted to the HMD 100 and used for control of the HMD 100. The controller 200 may be a controller dedicated to the HMD 100, or may be a non-dedicated apparatus such as a smartphone or a tablet terminal.

Note that, in the present embodiment, the operation member used for control of the HMD 100 is provided to the controller 200 separate from the HMD 100, but the operation member may be provided integrally with the HMD 100. Furthermore, in the present embodiment, the HMD 100 is controlled by itself, but an information processing apparatus (for example, server) separate from the HMD 100 may receive information on user operation and transmit a control signal to the HMD 100 to control the HMD 100.

Figure 2:
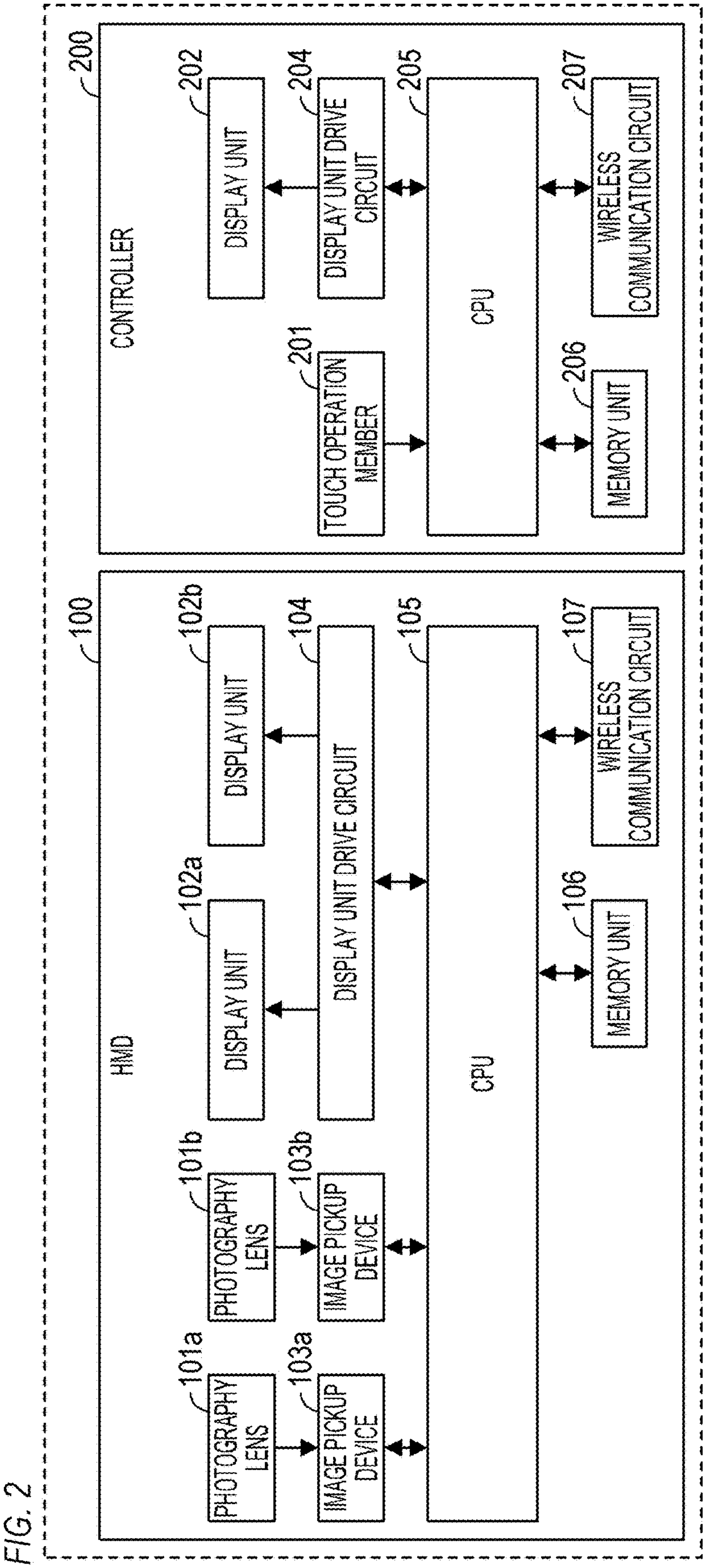
FIG. 2 is a block diagram of the display system.

FIG. 2 is a block diagram illustrating a configuration of the display system (HMD 100 and controller 200) according to the present embodiment. The HMD 100 includes the photography lenses 101*a* and 101*b*, the display units 102*a* and 102*b*, image pickup devices 103*a* and 103*b*, a display unit drive circuit 104, a CPU 105, a memory unit 106, and a wireless communication circuit 107. The controller 200 includes the touch operation member 201, a display unit 202, a display unit drive circuit 204, a CPU 205, a memory unit 206, and a wireless communication circuit 207.

In the HMD 100, the CPU 105 controls the image pickup devices 103*a* and 103*b*, the display unit drive circuit 104, the memory unit 106, and the wireless communication circuit 107. The image pickup device 103*a* images real space through the photography lens 101*a*, and the image pickup device 103*b* images real space through the photography lens 101*b*. The display unit drive circuit 104 drives the display units 102*a* and 102*b* such that various kinds of images are displayed. The memory unit 106 stores various kinds of information therein. For example, a control program is stored in the memory unit 106 in advance, and the CPU 105 reads the control program from the memory unit 106 and executes the control program to control the units in the HMD 100. The wireless communication circuit 107 enables wireless communication (including communication via the Internet) between the HMD 100 and an external device.

In the controller 200, the CPU 205 receives a signal from the touch operation member 201 (signal output in response to touch operation), and controls the display unit drive circuit 204, the memory unit 206, and the wireless communication circuit 207. The display unit drive circuit 204 drives the display unit 202 such that various kinds of images (various kinds of screens) are displayed. The memory unit 206 stores various kinds of information therein. For example, a control program is stored in the memory unit 206 in advance, and the CPU 205 reads the control program from the memory unit 206 and executes the control program to control the units in the controller 200. The wireless communication circuit 207 enables wireless communication (including communication via the Internet) between the controller 200 and an external device.

In the present embodiment, wireless communication is performed between the wireless communication circuit 107 in the HMD 100 and the wireless communication circuit 207 in the controller 200, but wired communication may be performed between the HMD 100 and the controller 200. In the controller 200, the touch operation member 201 and the display unit 202 may be separate units, or may be integrally provided like a touch panel. The controller 200 may have, in addition to the touch operation member 201, one or more operation members such as a lever, a direction key, and a button.

Description of User Operation

In the present embodiment, the HMD 100 is controlled in accordance with touch operation performed on the touch operation member 201 (touch operation surface) of the controller 200. When a user touches the touch operation member 201, the CPU 205 in the controller 200 recognizes a touch position (position (coordinates) at which touch is performed), and notifies the CPU 105 in the HMD 100 of the touch position through the wireless communication circuits

207 and 107. Then, the CPU 105 determines that a position (coordinates, display position) in a displayed image that corresponds to the notified touch position has been designated, and performs control according to the determination result.

Description of Calibration of Touch Operation

In general, when a user performs touch operation on a touch panel, the user touches a desired location on the touch panel (touch operation surface) while looking at an image displayed on the touch panel. Similarly, in the case of an absolute coordinate system in which coordinates on an image and coordinates on a touch operation surface are associated on one-on-one basis, a user preferably touches a desired location while looking at the touch operation surface. However, when a user performs touch operation on the touch operation member 201 while wearing the HMD 100, the user cannot look at the controller 200 and cannot easily touch a desired location on the touch operation member 201 (touch operation surface). This is a first problem.

Systems of touch operation include a relative coordinate system in addition to the absolute coordinate system. In the case of the relative coordinate system, for example, various kinds of control are performed on the basis of a positional relation between the previous touch position and the current touch position. However, the size of an image looked by a user and the size of the touch operation member 201 (touch operation surface) are different from each other, and hence the user cannot easily grasp how a distance from the previous touch position to the current touch position will be treated in an image. This is a second problem.

Thus, in the present embodiment, calibration described later is executed such that, in touch operation in the absolute coordinate system, a user can easily touch a desired location on the touch operation member 201 (touch operation surface) even if the user cannot look at the controller 200.

Figure 3A:
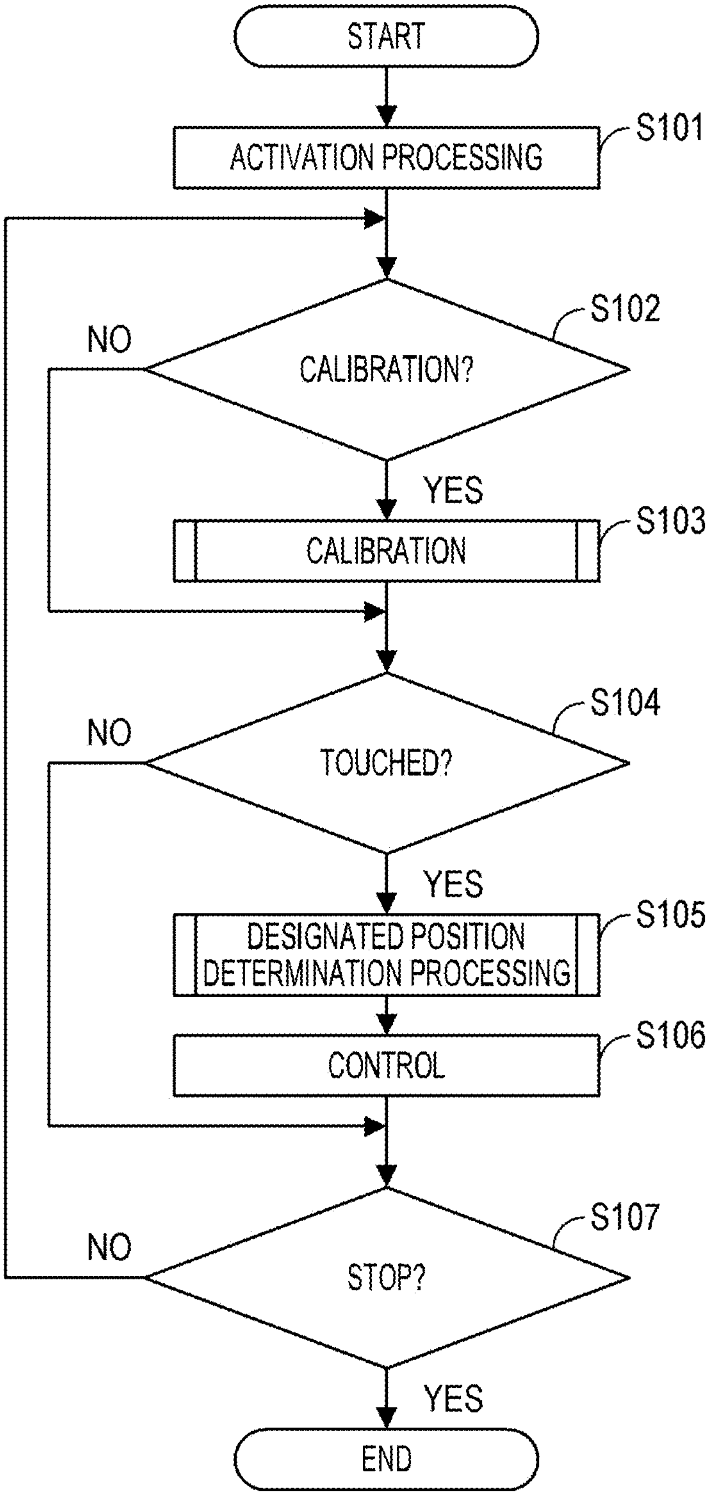
FIGS. 3A to 3C are flowcharts illustrating operations of an HMD.

FIG. 3A is a flowchart illustrating operation of the HMD 100. The operation in FIG. 3A is started, for example, in response to activation of the HMD 100 is instructed by a user or the HMD 100 is mounted to the head of a user.

In Step S101, the CPU 105 performs activation processing. Examples of the activation processing include initial settings such as initialization of various parameters used for control of the HMD 100.

In Step S102, the CPU 105 determines whether to execute calibration. When the CPU 105 determines to execute calibration, the flow proceeds to Step S103. Otherwise, the flow proceeds to Step S104.

Calibration is preferably executed when a user has started carrying (carried again) the controller 200 or when a user has been changed. For example, the CPU 105 determines to execute (start) calibration when a user has worn the HMD 100. The wearing of the HMD 100 by a user is detected by, for example, using a sensor (not shown) provided to the HMD 100. The CPU 105 may determine to execute calibration when a user has instructed the execution of calibration. For example, a user uses the controller 200 to instruct the execution of calibration. The CPU 105 may acquire information on the line of sight of a user, and determine to execute calibration when a position gazed by the user has changed by a change amount larger than a predetermined change amount. The information on the line of sight is acquired by, for example, using a sensor (not shown) provided to the HMD 100. The information on the line of sight may be angle information indicating a direction of the line of sight or may be coordinate information indicating a position looked by the user. A position gazed by the user is, for example, a position at which the line of sight of the user stays for a time longer than a predetermined time. The CPU 105 may count the duration under a state in which user operation is not performed, and determine to execute calibration when the duration has reached a predetermined period (when predetermined period has elapsed without user operation). The user operation as used herein may be regarded as user operation on the controller 200, or may be regarded as touch operation on the touch operation member 201.

In the case where calibration is not executed, the CPU 105 may use a result of calibration executed in the past (calibration result). The CPU 105 may acquire information on a user, and store the calibration result in the memory unit 106 in association with the user. For example, information on the user is acquired by using publicly known person authentication processing. Then, the CPU 105 may read and use the calibration result associated with the current user from the memory unit 106. The CPU 105 may determine not to execute calibration when the calibration result associated with the current user is stored in the memory unit 106.

Figure 3B:
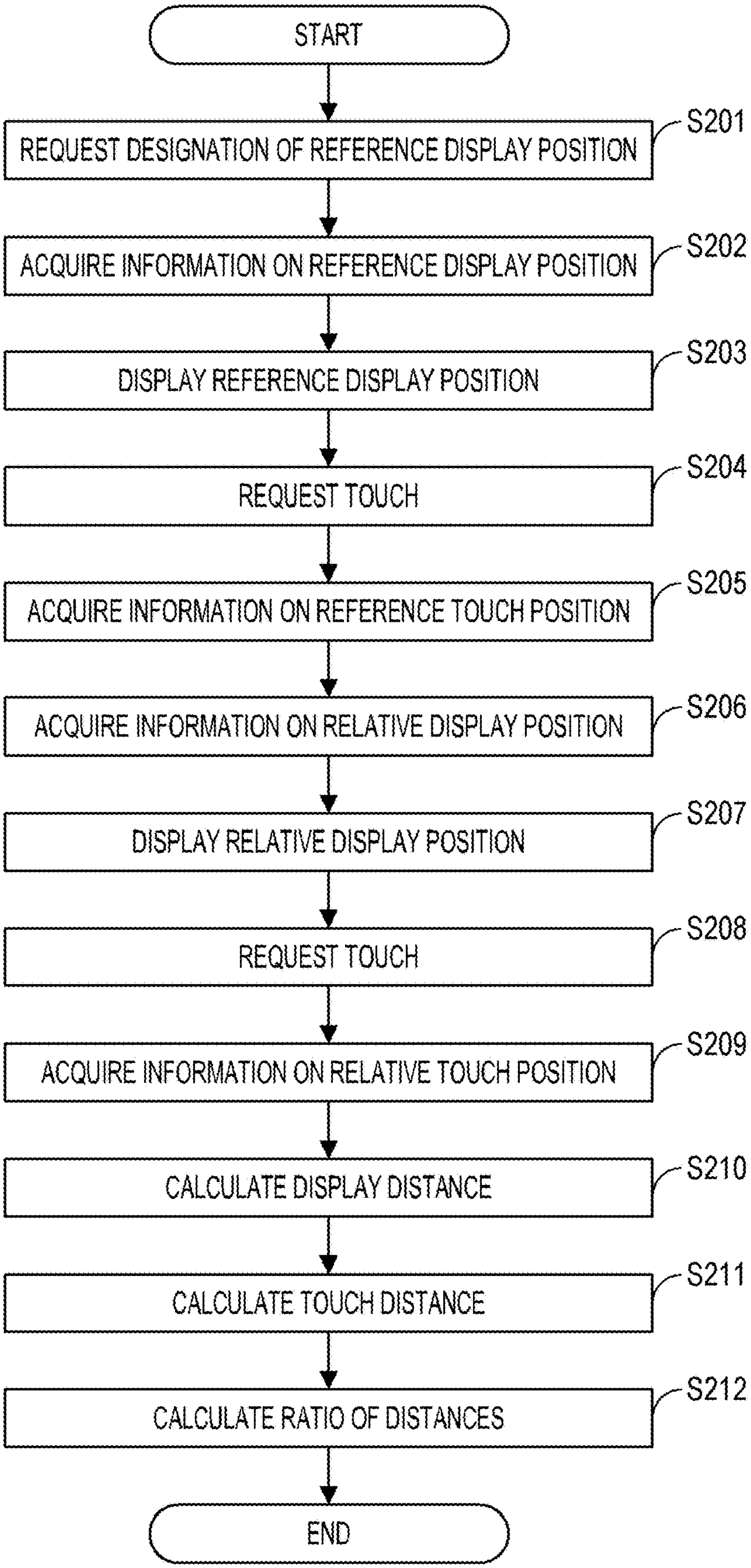

In Step S103, the CPU 105 executes calibration. FIG. 3B is a flowchart of the calibration.

In Step S201, the CPU 105 causes a user to designate a reference display position. For example, the CPU 105 controls the display units 102*a* and 102*b* to display a guidance "Designate a point in the image.".

For example, the user designates a reference display position by using an operation member different from the touch operation member 201 (operation member capable of receiving user operation different from touch operation, for example, lever, direction key, or button). The CPU 105 may acquire information on the line of sight of the user, and determine a position gazed by the user as a reference display position. The CPU 105 may acquire information on the orientation of the controller 200, and determine a position to which the controller 200 (predetermined surface of controller 200) is oriented as a reference display position. For example, the information on the orientation of the controller 200 is acquired by a sensor (for example, gyro sensor) (not shown) provided to the controller 200, and transmitted from the controller 200 to the HMD 100.

In Step S202, the CPU 105 acquires information (coordinate information) on the reference display position designated in Step S201, and stores the acquired information in the memory unit 108.

Note that the reference display position may be a position determined in advance, and information on the reference display position may be stored in the memory unit 106 in advance. In such a case, the CPU 105 may omit Steps S201 and S202. The reference display position determined in advance may be a position determined by a manufacturer in advance or may be a position designated by a user in the past. The CPU 105 may determine whether to omit Steps S201 and S202 depending on whether information on the reference display position has been stored in the memory unit 106.

In Step S203, the CPU 105 enables the reference display position to be identified on the basis of information on the reference display position. For example, the CPU 105 displays an item indicating the reference display position on the display units 102*a* and 102*b*.

In Step S204, the CPU 105 causes the user to perform touch while being conscious of the reference display position (touch on touch operation member 201 (touch operation surface)). For example, the CPU 105 controls the display units 102*a* and 102*b* to display a guidance "Touch the touch operation surface to designate a first item."

Figure 4:
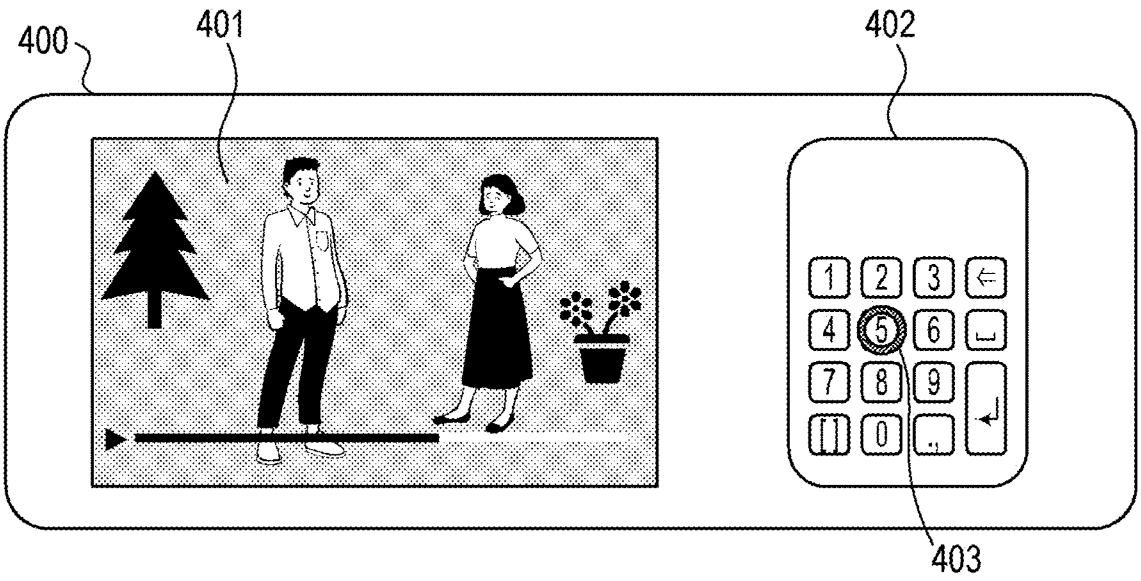
FIG. 4 is a schematic diagram illustrating an image displayed by the HMD.

FIG. 4 is a schematic diagram illustrating an image 400 displayed by the HMD 100 (display units 102*a*, 102*b*). The image 400 includes image contents 401 and a graphic 402 that represents the touch operation member 201 (touch operation surface). In the present embodiment, the touch operation member 201 and the display unit 202 are provided integrally like a touch panel. The graphic 402 indicates an image displayed on the display unit 202. In FIG. 4, an item 403 is displayed at a reference display position. In Step S204, a user touches the touch operation member 201 while viewing the item 403.

In Step S205, the CPU 105 acquires information on a position touched in Step S204 (coordinate information) from the controller 200, and stores the acquired information in the memory unit 108 as information on a reference touch position.

In Step S206, the CPU 105 acquires, on the basis of information on the reference display position, information (coordinate information) on a position that has a predetermined positional relation with the reference display position as information on a relative display position. Then, the CPU 105 stores information on the relative display position in the memory unit 108.

Note that, similarly to the reference display position, the relative display position may be a position determined in advance, and information on the relative display position may be stored in the memory unit 106 in advance. In such a case, the CPU 105 may omit Step S206. The CPU 105 may determine whether to omit Step S206 depending on whether information on the relative display position has been stored in the memory unit 106.

In Step S207, the CPU 105 enables the relative display position to be identified on the basis of information on the relative display position. For example, the CPU 105 displays an item indicating the relative display position on the display units 102*a* and 102*b*.

In Step S208, the CPU 105 causes the user to perform touch while being conscious of the relative display position (touch on touch operation member 201 (touch operation surface)). For example, the CPU 105 controls the display units 102*a* and 102*b* to display a guidance "Touch the touch operation surface to designate a second item."

Figure 5:
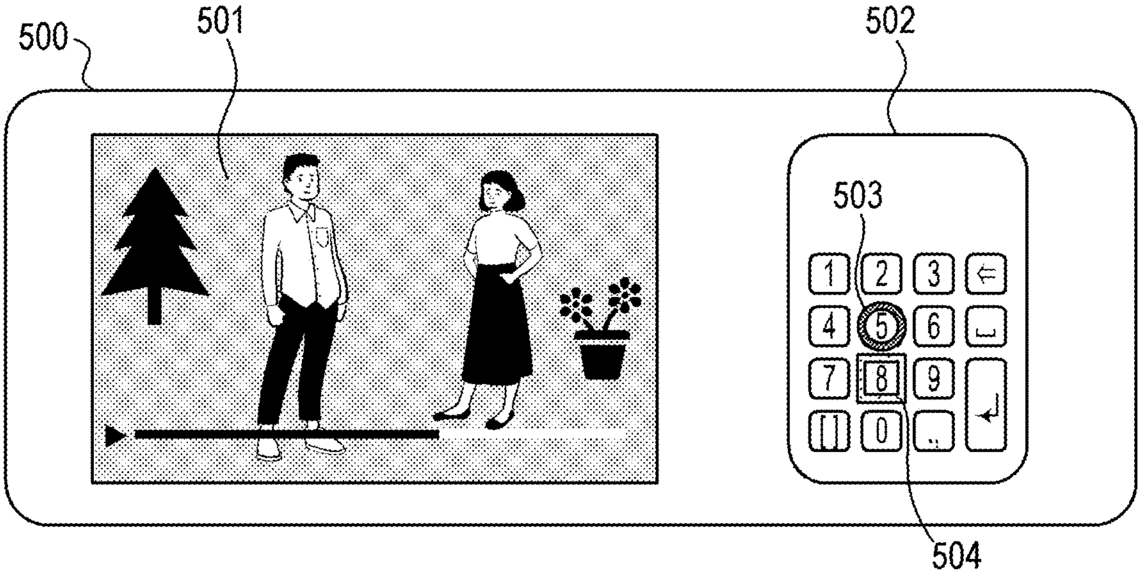
FIG. 5 is a schematic diagram illustrating an image displayed by the HMD.

FIG. 5 illustrates an image 500 displayed by the HMD 100 (display units 102*a*, 102*b*). Similarly to FIG. 4, the image 500 includes image contents 501 and a graphic 502 (graphic indicating image displayed on display unit 202) that represents the touch operation member 201 (touch operation surface). In FIG. 5, an item 504 is displayed at a relative display position. In Step S208, a user touches the touch operation member 201 while viewing the item 504.

Note that, in the case of enabling the relative display position to be identified, the CPU 105 may stop the processing of enabling the reference display position to be identified, or may continue to enable the reference display position to be identified. By continuing to enable the reference display position to be identified, the user can perform touch while being easily conscious of the positional relation between the reference display position and the relative display position. In FIG. 5, an item 503 is displayed at the reference display position. In FIG. 5, the relative display position is set on the lower side of the reference display position, but the positional relation between the reference display position and the relative display position is not particularly limited.

Furthermore, modes (for example, color, luminance, shape, size, or combination thereof) of the item 503 indicating the reference display position and modes of the item 504 indicating the relative display position may be the same, or may be different. When the modes of the item 503 and the modes of the item 504 are different from each other, a user can be prevented from erroneously recognizing the position of the item 503 as a relative display position and from erroneously recognizing the position of the item 504 as a reference display position.

In Step S209, the CPU 105 acquires information on a position touched in Step S208 (coordinate information) from the controller 200, and stores the acquired information in the memory unit 108 as information on a relative touch position.

In Step S210, the CPU 105 calculates, on the basis of information on the reference display position and information on the relative display position, a distance from the reference display position to the relative display position as a reference distance. Then, the CPU 105 stores information on the reference distance (distance information) in the memory unit 108.

In Step S211, the CPU 105 calculates, on the basis of information on the reference touch position and information on the relative touch position, a distance from the reference touch position to the relative touch position as a touch distance. Then, the CPU 105 stores information on the touch distance (distance information) in the memory unit 108.

In Step S212, the CPU 105 calculates a ratio of the reference distance calculated in the Step S210 to the touch distance calculated in Step S211, and stores the ratio (ratio information) in the memory unit 108. The CPU 105 may calculate a ratio of the touch distance calculated in Step S211 to the reference distance calculated in Step S210.

Figure 6:
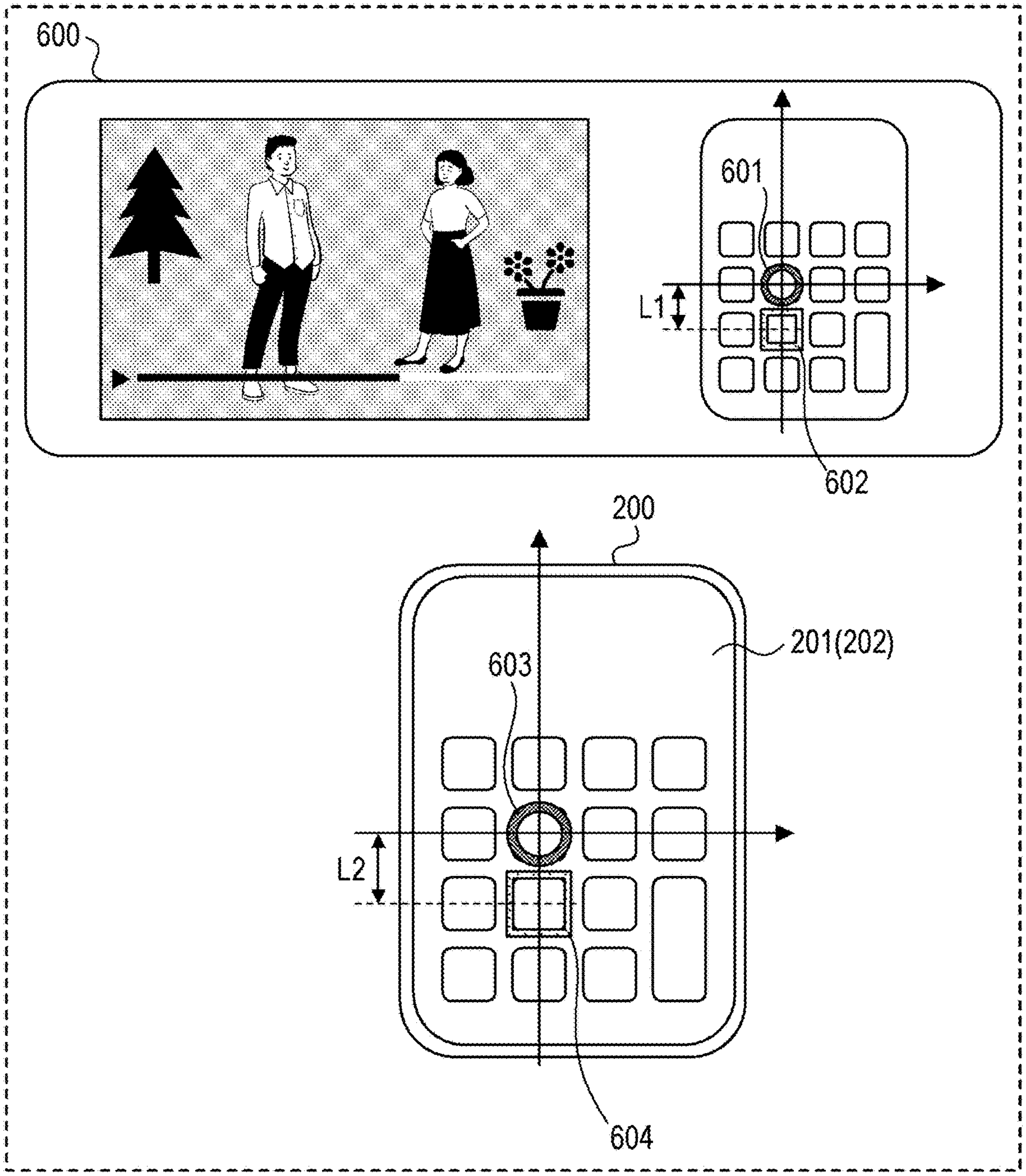
FIG. 6 is a schematic diagram illustrating an image displayed by the HMD and a controller.

FIG. 6 is a schematic diagram illustrating an image 600 displayed by the HMD 100 (display units 102*a*, 102*b*) and the controller 200. FIG. 6 illustrates a reference display position 601, a relative display position 602, a reference touch position 603, and a relative touch position 604. A distance from the reference display position 601 to the relative display position 602 is a distance L1, and a distance from the reference touch position 603 to the relative touch position 604 is a distance L2. In Step S212, the CPU 105 calculates a ratio L1/L2.

Note that Step S212 is not necessarily required to be included in the calibration, and may be included in designated position determination processing described later.

Furthermore, the ease of movement of a finger is different depending on direction, and hence a user may be caused to perform a plurality of touches while being conscious of a plurality of relative display positions, thereby acquiring information on a plurality of relative touch positions. Then, a plurality of reference distances corresponding to the plurality of relative display positions, a plurality of touch distances corresponding to the plurality of relative touch positions, and a plurality of ratios corresponding to a plurality of combinations of the relative display position and the relative touch position may be calculated.

Description is given with reference to FIG. 3A again. In Step S104, the CPU 105 determines whether the touch operation member 201 (touch operation surface) has been touched. As described above, when a user touches the touch operation member 201, the touch position is notified from the controller 200 to the HMD 100. The CPU 105 can determine whether the touch operation member 201 has been touched by determining whether the touch position has been notified. When the CPU 105 determines that the touch operation member 201 has been touched, the flow proceeds to Step S105. Otherwise, the flow proceeds to Step S107.

Figure 3C:
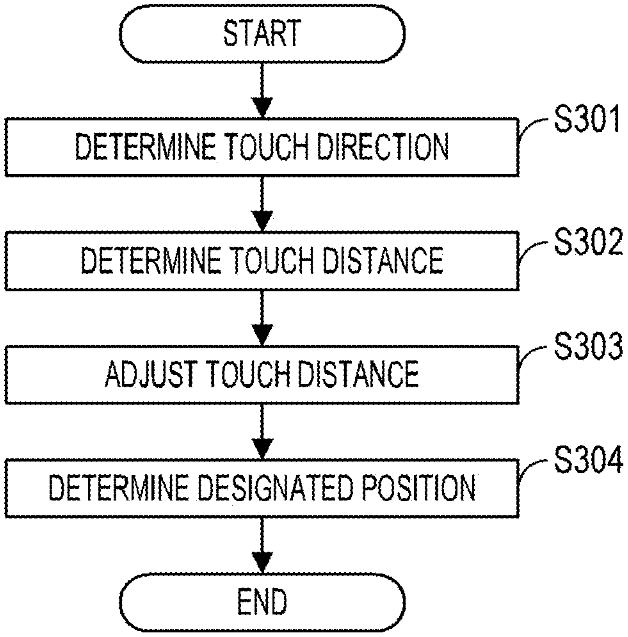

In Step S105, the CPU 105 performs designated position determination processing for determining a display position designated by the user on the basis of the result of calibration. FIG. 3C is a flowchart of the designated position determination processing.

In Step S301, the CPU 105 determines, on the basis of information on the touch reference position obtained by calibration and information on the current display position obtained in Step S104, a direction (touch direction) from the touch reference position toward the current touch position. For example, the CPU 105 determines a coordinate system whose origin is the touch reference position as a touch coordinate system, and acquires information expressed by the touch coordinate system as information on the touch direction.

In Step S302, the CPU 105 determines, on the basis of information on the touch reference position obtained by calibration and information on the current display position obtained in Step S104, a distance (touch distance) from the touch reference position to the current touch position.

In Step S303, the CPU 105 adjusts the touch distance obtained in Step S302 by a magnification factor based on the ratio obtained by calibration. In this manner, the touch distance (distance on touch operation surface) is converted to a reference distance (distance on image displayed by HMD 100). In the present embodiment, one ratio is obtained by calibration, and in Step S303, the touch distance obtained in Step S302 is adjusted by a magnification factor equal to the ratio (touch distance obtained in Step S302 is multiplied with ratio obtained by calibration). Note that the ratio and the magnification factor may be different from each other. For example, when a plurality of ratios is obtained in the calibration, the plurality of ratios may be combined to determine a magnification factor.

In Step S304, the CPU 105 determines a display position designated by the user on the basis of information on the display reference position obtained by calibration, the touch direction determined in Step S301, and the display distance (adjusted distance) obtained in Step S303. The CPU 105 determines that a position that is away from the reference display position by the display distance obtained in Step S303 in a direction (display direction) based on the touch direction determined in Step S301 has been designated. For example, the CPU 105 determines a coordinate system whose origin is the display reference position as a display coordinate system. The CPU 105 converts, on the basis of a correspondence relation between the display coordinate system and the touch coordinate system, the touch direction (direction on touch operation surface) determined in Step S301 to a display direction (direction on image displayed by HMD 100). Then, the CPU 105 determines that a position that is away from the reference display position by the display distance obtained in Step S303 in the display direction has been designated.

In the present embodiment, an axis parallel to a lateral direction (horizontal direction, left-right direction) of the touch operation surface is an X axis (horizontal axis) of the touch coordinate system, and an axis parallel to a longitudinal direction (vertical direction, up-down direction) of the touch operation surface is an Y axis (vertical axis) of the touch coordinate system. Then, an axis parallel to a lateral direction of an image displayed by the HMD 100 is an X axis of the display coordinate system, and an axis parallel to a longitudinal direction of the image is an Y axis of the display coordinate system.

Note that the touch coordinate system and the display coordinate system are not limited to the above-mentioned coordinate systems. For example, an axis parallel to a straight line passing through the reference touch position and the relative touch position may be an X axis of the touch coordinate system, and an axis perpendicular to the X axis may be a Y axis of the touch coordinate system. Similarly, an axis parallel to a straight line passing through the reference display position and the relative display position may be an X axis of the display coordinate system, and an axis perpendicular to the X axis may be a Y axis of the display coordinate system.

As described above, there may be a plurality of relative display positions and a plurality of relative touch positions corresponding to the plurality of relative display positions. In such a case, an axis parallel to a straight line passing through the reference touch position and a first relative touch position may be an X axis of the touch coordinate system, and an axis parallel to a straight line passing through the reference touch position and a second relative touch position may be a Y axis of the touch coordinate system. Similarly, an axis parallel to a straight line passing through the reference display position and a first relative display position may be an X axis of the display coordinate system, and an axis parallel to a straight line passing through the reference display position and a second relative display position may be a Y axis of the display coordinate system.

A direction from the reference touch position toward the first relative touch position may be a positive direction of the X axis of the touch coordinate system, and a direction from the reference touch position toward the second relative touch position may be a negative direction of the X axis of the touch coordinate system. Then, a direction from the reference touch position toward a third relative touch position may be a positive direction of the Y axis of the touch coordinate system, and a direction from the reference touch position toward a fourth relative touch position may be a negative direction of the Y axis of the touch coordinate system. Similarly, a direction from the reference display position toward the first relative display position may be a positive direction of the X axis of the display coordinate system, and a direction from the reference display position toward the second relative display position may be a negative direction of the X axis of the display coordinate system. Then, a direction from the reference display position toward a third relative display position may be a positive direction of the Y axis of the display coordinate system, and a direction from the reference display position toward a fourth relative display position may be a negative direction of the Y axis of the display coordinate system.

Description is given with reference to FIG. 3A again. In Step S106, the CPU 105 performs control in accordance with the determination result (display position designated by user) obtained in Step S105.

In Step S107, the CPU 105 determines whether to stop the HMD 100 (turn off power supply of HMD 100). For example, the CPU 105 determines to stop the HMD 100 when the stop of the HMD 100 is instructed by the user or when the HMD 100 is detached from the head of the user. When the CPU 105 determines to stop the HMD 100, the operation in FIG. 3A is finished, and the HMD 100 is stopped. Otherwise, the flow proceeds to Step S102.

As described above, according to the present embodiment, with a simple configuration without using a camera, user operation with high operability can be performed by executing calibration in which a user is caused to touch each of a plurality of display positions while being conscious of the display position. After the calibration, user operation which has no limitation on the motion of the user and which facilitates desired instructions can be performed.

According to the present embodiment, a user is caused to touch each of a plurality of display positions while being conscious of the display position, and hence the touch position can be associated with a display position intended by the user. Thus, the user can perform touch while easily grasping a desired location on the touch operation surface (location corresponding to desired display position) without looking at the touch operation surface. In other words, the first problem can be solved. Furthermore, a user can easily grasp the correspondence relation between a distance on the image and a distance on the touch operation surface. In other words, the above-mentioned second problem can be solved.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, user operation with high operability (user operation which has no limitation of motion of user and which facilitates desired instructions) can be performed with a simple configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus, for example, by reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-196447, filed on Nov. 20, 2023, which is hereby incorporated by reference herein in its entirety.

What is claimed is:

1. An information processing apparatus comprising:

one or more processors and/or circuitry configured to control a head-mounted display apparatus in accordance with touch operation on a touch operation surface, wherein, in calibration of the touch operation, the one or more processors and/or circuitry:

(1) controls the head-mounted display apparatus such that a first display position, which is a position in an image displayed by the head-mounted display apparatus, is identifiable;

(2) causes a user to perform touch on the touch operation surface while being conscious of the first display position, and acquires information on a first touch position that is a position at which the touch is performed;

(3) controls the head-mounted display apparatus such that a second display position that has a predetermined positional relation with the first display position is identifiable; and (4) causes the user to perform touch on the touch operation surface while being conscious of the second display position, and acquire information on a second touch position that is a position at which the touch is performed, and wherein, in a case where touch on the touch operation surface is performed after the calibration, the one or more processors and/or circuitry:

(1) determines a direction from the first touch position toward a third touch position that is a position at which the touch is performed;

(2) determines a distance from the first touch position to the third touch position;

(3) adjusts the determined distance by a magnification factor based on a ratio of a distance from the first display position to the second display position with respect to a distance from the first touch position to the second touch position; and (4) determines that a position that is away from the first display position by the adjusted distance in a direction based on the determined direction is designated.

2. The information processing apparatus according to claim 1, wherein, in the calibration, furthermore, the one or more processors and/or circuitry calculates a ratio of a distance from the first display position to the second display position with respect to a distance from the first touch position to the second touch position.

3. The information processing apparatus according to claim 1, wherein, in a case where touch on the touch operation surface is performed after the calibration, the one or more processors and/or circuitry:

determines a direction from the first touch position toward the third touch position;

determines a distance from the first touch position to the third touch position;

adjusts the determined distance by a magnification factor equal to the ratio; and determines that a position that is away from the first display position by the adjusted distance in the determined direction is designated.

4. The information processing apparatus according to claim 1, wherein, in the calibration, furthermore, the one or more processors and/or circuitry causes the user to designate the first display position.

5. The information processing apparatus according to claim 4, wherein the one or more processors and/or circuitry acquires information on a line of sight of the user, and determines a position gazed by the user as the first display position designated by the user.

6. The information processing apparatus according to claim 4, wherein the one or more processors and/or circuitry acquires information on an orientation of a controller having the touch operation surface, and determines a position to which the controller is oriented as the first display position designated by the user.

7. The information processing apparatus according to claim 4, wherein the first display position is designated by using an operation member that is capable of receiving user operation different from the touch operation.

8. The information processing apparatus according to claim 1, wherein the first display position is a predetermined position.

9. The information processing apparatus according to claim 1, wherein the one or more processors and/or circuitry executes the calibration in response to the user wearing the head-mounted display apparatus.

10. The information processing apparatus according to claim 1, wherein the one or more processors and/or circuitry executes the calibration in response to receiving a user instruction to execute the calibration.

11. The information processing apparatus according to claim 1, wherein the one or more processors and/or circuitry executes the calibration in response to a duration during which no user operation is performed reaching a predetermined period.

12. The information processing apparatus according to claim 1, wherein the one or more processors and/or circuitry acquires information on a line of sight of the user, and executes the calibration in response to a position gazed by the user changing by a change amount larger than a predetermined change amount.

13. The information processing apparatus according to claim 1, wherein the one or more processors and/or circuitry controls the head-mounted display apparatus such that the first display position is continued to be identifiable when enabling the second display position to be identified.

14. The information processing apparatus according to claim 1, wherein the one or more processors and/or circuitry enables the first display position to be identified by displaying a first item at the first display position and enables the second display position to be identified by displaying a second item at the second display position.

15. A control method of an information processing apparatus configured to control a head-mounted display apparatus in accordance with touch operation on a touch operation surface, the control method comprising:

a step of executing calibration of the touch operation, wherein the step of executing the calibration includes:

(1) a step of controlling the head-mounted display apparatus such that a first display position, which is a position in an image displayed by the head-mounted display apparatus, is identifiable;

(2) a step of causing a user to perform touch on the touch operation surface while being conscious of the first display position, and acquires information on a first touch position that is a position at which the touch is performed;

(3) a step of controlling the head-mounted display apparatus such that a second display position that has a predetermined positional relation with the first display position is identifiable; and (4) a step of causing the user to perform touch on the touch operation surface while being conscious of the second display position, and acquire information on a second touch position that is a position at which the touch is performed, and wherein, in a case where touch on the touch operation surface is performed after the calibration:

(1) a direction from the first touch position toward a third touch position that is a position at which the touch is performed is determined, (2) a distance from the first touch position to the third touch position is determined, (3) the determined distance is adjusted by a magnification factor based on a ratio of a distance from the first display position to the second display position with respect to a distance from the first touch position to the second touch position, and (4) it is determined that a position that is away from the first display position by the adjusted distance in a direction based on the determined direction is designated.

16. A non-transitory computer-readable medium that stores a program, wherein the program causes a computer to execute a control method of an information processing apparatus configured to control a head-mounted display apparatus in accordance with touch operation on a touch operation surface, the control method comprising:

a step of executing calibration of the touch operation, wherein the step of executing the calibration includes:

(1) a step of controlling the head-mounted display apparatus such that a first display position, which is a position in an image displayed by the head-mounted display apparatus, is identifiable;

(2) a step of causing a user to perform touch on the touch operation surface while being conscious of the first display position, and acquires information on a first touch position that is a position at which the touch is performed;

(3) a step of controlling the head-mounted display apparatus such that a second display position that has a predetermined positional relation with the first display position is identifiable; and (4) a step of causing the user to perform touch on the touch operation surface while being conscious of the second display position, and acquire information on a second touch position that is a position at which the touch is performed, and wherein, in a case where touch on the touch operation surface is performed after the calibration:

(1) a direction from the first touch position toward a third touch position that is a position at which the touch is performed is determined, (2) a distance from the first touch position to the third touch position is determined, (3) the determined distance is adjusted by a magnification factor based on a ratio of a distance from the first display position to the second display position with respect to a distance from the first touch position to the second touch position, and (4) it is determined that a position that is away from the first display position by the adjusted distance in a direction based on the determined direction is designated.

* * * * *